US012680601B2

(12) United States Patent
Baeumler et al.

(10) Patent No.: US 12,680,601 B2
(45) Date of Patent: Jul. 14, 2026

(54) MOTOR VEHICLE DRIVE DEVICE

(71) Applicant: Bayerische Motoren Werke Aktiengesellschaft, Munich (DE)

(72) Inventors: Richard Baeumler, Munich (DE); Stefan Brachmeier, Landshut (DE); Georg Johann Meingassner, Taufkirchen (DE); Tobias Riesch, Lenggries (DE); Michael Staake, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/880,311

(22) PCT Filed: Jul. 18, 2023

(86) PCT No.: PCT/EP2023/069913
§ 371 (c)(1),
(2) Date: Dec. 31, 2024

(87) PCT Pub. No.: WO2024/037808
PCT Pub. Date: Feb. 22, 2024

(65) Prior Publication Data
US 2025/0389324 A1 Dec. 25, 2025

(30) Foreign Application Priority Data
Aug. 17, 2022 (DE) .................... 10 2022 120 761.7

(51) Int. Cl.
*F16H 57/021* (2012.01)
*F16H 1/20* (2006.01)
(Continued)

(52) U.S. Cl.
CPC ............. *F16H 57/021* (2013.01); *F16H 1/20* (2013.01); *F16H 57/031* (2013.01); *F16H 55/17* (2013.01);
(Continued)

(58) Field of Classification Search
CPC ......... F16H 57/021; F16H 2057/02034; F16H 1/20; F16H 57/031; F16H 55/17; F16H 2057/02052; B60K 2001/001
See application file for complete search history.

(56) References Cited

U.S. PATENT DOCUMENTS 5,609,072 A     3/1997 Lequis et al.
9,366,250 B1 *  6/2016 Takeda .................... F04C 2/084
(Continued)

FOREIGN PATENT DOCUMENTS

CN       105757210 A     7/2016
DE       44 40 742 C1    4/1996
(Continued)

OTHER PUBLICATIONS

International Search Report (PCT/ISA/210) issued in PCT Application No. PCT/EP2023/069913 dated Sep. 25, 2023 with English translation (5 pages).
(Continued)

*Primary Examiner* — Jake Cook
(74) *Attorney, Agent, or Firm* — Crowell & Moring LLP

(57) ABSTRACT

A motor vehicle drive system having a traction transmission device. A traction transmission drive shaft is rotatably mounted in the transmission housing device. A traction transmission intermediate shaft is arranged axially parallel to and radially spaced apart from the traction transmission drive shaft. A traction transmission output shaft is arranged axially parallel to and radially spaced apart from the other two traction transmission shafts. The motor vehicle drive
(Continued)

system is characterized in that the three traction transmission shafts are each mounted in the traction transmission housing device with a fixed/floating bearing; such a bearing has in each case at least one fixed bearing for absorbing axial forces; and at least two of these fixed bearings are mounted in the traction transmission cover.

18 Claims, 7 Drawing Sheets

(51) Int. Cl.
    *F16H 55/17*         (2006.01)
    *F16H 57/02*         (2012.01)
    *F16H 57/031*       (2012.01)

(52) U.S. Cl.
    CPC .............. *F16H 2057/02034* (2013.01); *F16H 2057/02052* (2013.01)

(56) References Cited

U.S. PATENT DOCUMENTS

| | | | |
|---|---|---|---|
| 11,353,103 B2 * | 6/2022 | Kawanishi ............. | H02K 7/116 |
| 11,873,885 B2 * | 1/2024 | Labelle ................. | F16H 57/021 |
| 2005/0109567 A1 | 5/2005 | Baumann et al. | |
| 2010/0236845 A1 | 9/2010 | Ishii et al. | |
| 2019/0249765 A1 * | 8/2019 | Ito ............................ | B60K 1/00 |
| 2021/0083546 A1 | 3/2021 | Garcia et al. | |
| 2022/0099168 A1 | 3/2022 | Lee et al. | |
| 2022/0274484 A1 | 9/2022 | Jinnai et al. | |

FOREIGN PATENT DOCUMENTS

| | | |
|---|---|---|
| DE | 694 04 768 T2 | 2/1998 |
| DE | 103 49 078 A1 | 5/2005 |
| DE | 10 2019 127 242 A1 | 4/2021 |
| DE | 11 2020 003 761 T5 | 4/2022 |
| EP | 3 937 353 A1 | 1/2022 |
| JP | 2001-190042 A | 7/2001 |
| WO | WO 2021/054938 A1 | 3/2021 |
| WO | WO 2021/095418 A1 | 5/2021 |

OTHER PUBLICATIONS

German-language Written Opinion (PCT/ISA/237) issued in PCT Application No. PCT/EP2023/069913 dated Sep. 25, 2023 with English translation (9 pages).

German-language Search Report issued in German Application No. 10 2022 120 761.7 dated Mar. 1, 2023 with partial English translation (15 pages).

De Pinto, S. et al., "On the Comparison of 2- and 4-Wheel-Drive Electric Vehicle Layouts with Central Motors and Single-and 2-Speed Transmission Systems", Energies, Jun. 30, 2020 (2 pages).

Platten, M., "Who's Afraid of Innovation?", Journal of Gear Manufacturing, Gear Technology, Sep.-Oct. 2014, pp. 32-35, vol. 31, No. 7 (6 pages).

Kienleitner, M., "Verifizieren von Kennwerten fuer die Optimierung von PKW-Getrieben hinsichtlich Getriebeheulen", Masterarbeit, Technische Universität Graz, AVL, Jun. 2016 (21 pages).

Marano, D. et al., "NVH Analysis and Simulation of Automotive E-Axles", Gear Technology, Jan.-Feb. 2021, pp. 58-69, vol. 38, No. 1 (14 pages).

"Waelzlagertechnik", SNR Group, Bearing Technology, 2004, pp. 119-120, vol. 2 (4 pages).

* cited by examiner

MOTOR VEHICLE DRIVE DEVICE

BACKGROUND AND SUMMARY

The invention relates to an electrical motor vehicle drive system for overcoming motor vehicle driving resistances such as rolling resistance, air resistance and the like, and to a motor vehicle having such a drive system.

DE 10 2019 127 242 A1 discloses an electric drive apparatus for a motor vehicle having a transmission, and a drive arrangement having a transmission and an electric machine.

A general requirement for the drive of a motor vehicle is that the drive provides the required drive power in a comfortable and efficient manner. These two properties, or the achievement thereof, can have a negative influence on one another. The invention is discussed below on the basis of a motor vehicle drive system having a gearwheel transmission, the gearwheels of this transmission having what is known as an involute toothing. In the case of such toothings, it is known that what are known as deep toothings, that is to say in particular pairs of gearwheels having a transverse contact ratio>=2.0 and an overlap ratio>=2.0, enable a particularly comfortable drive. Although it is possible in the case of a pair of gearwheels having a lower transverse contact ratio and a different contact ratio combination to improve the efficiency compared with the deep toothing discussed above, this generally leads to a disadvantage in acoustics and thus degrades the comfort during power transmission. Furthermore, in the case of a motor vehicle drive, insulation of noises by means of additional insulating materials is fundamentally also possible, but this has a negative effect on the vehicle weight, entails additional outlay and thus degrades the efficiency of the motor vehicle.

The invention accordingly proposes a motor vehicle drive system which equally enables a transmission of drive power with high efficiency and high comfort. This object is achieved by a motor vehicle drive system and by a motor vehicle having such a drive system, in accordance with the independent claim(s). The dependent patent claims each provide preferred developments of the invention.

In the invention, it is in particular proposed to take not only the toothings of the individual gearwheels but also the overall system into account, in particular the bearing arrangement of the transmission shafts in a transmission housing, and in particular the combination of bearing arrangement concept and toothing design then produces a drive system with high comfort and high efficiency.

In the context of the invention, a motor vehicle drive system should be understood to mean a system for driving a motor vehicle, preferably a passenger car, the drive power for overcoming driving resistances such as the frictional resistance, the rolling resistance, the air resistance and what is known as the acceleration resistance being provided by means of a preferably electromechanical energy converter. In the context of the invention, such an electromechanical energy converter should thus be understood to mean an electric drive machine, in particular an electric motor/generator, such an electric drive machine being known in different constructions.

Furthermore, the motor vehicle drive system has a traction transmission apparatus, this transmission apparatus being configured to transmit and adapt drive power to a load requirement of the motor vehicle, which results in particular from the driving resistances. The traction transmission apparatus is thus configured to transmit drive power in the form of rotation speed and torque to a motor vehicle axle drive.

Here, this motor vehicle axle drive should be understood in particular to mean a motor vehicle drive axle, in particular a front or rear axle.

The traction transmission apparatus has a traction transmission housing device, in particular the traction transmission housing device consists of multiple components and is preferably also configured to receive the electric drive machine. A traction transmission drive shaft is rotatably mounted in this traction transmission housing, this traction transmission drive shaft being able to be interpreted, in relation to a transmission of power from the electric drive machine to the motor vehicle axle drive, what is known as the motor drive direction, as a first shaft or as an input shaft into the traction transmission apparatus.

In a first embodiment of the invention, the traction transmission drive shaft is connected for conjoint rotation to the electric drive machine, is preferably oriented coaxially with respect thereto and is further preferably coupled for conjoint rotation directly thereto. In a further embodiment, the traction transmission drive shaft is selectively connectable for conjoint rotation to the electric drive machine, preferably by means of a clutch device. In particular, a permanently rotationally conjoint connection of the electric drive machine to the traction transmission drive shaft makes it possible to save on a bearing point, and a selectively couplable electric drive machine can reduce drag losses.

In addition to the traction transmission drive shaft, the traction transmission apparatus also has a traction transmission intermediate shaft, which, in relation to the motor drive direction, is arranged downstream of the traction transmission drive shaft, preferably is arranged directly downstream thereof. The traction transmission intermediate shaft is rotatably mounted in the traction transmission housing device and is arranged axially parallel to and at a radial spacing from the traction transmission drive shaft. Furthermore, the traction transmission apparatus also has a traction transmission output shaft, which, in relation to the motor drive direction, is arranged downstream of the traction transmission intermediate shaft, preferably is arranged directly downstream thereof. Furthermore, the traction transmission output shaft is rotatably mounted in the traction transmission housing device and is preferably arranged axially parallel to and at a radial spacing from the two other traction transmission shafts.

To form the traction transmission apparatus, that is to say in particular a transmission apparatus having two gearwheel stages for transmitting power from the electric drive machine to the motor vehicle axle drive, a traction transmission drive gearwheel is arranged on the traction transmission drive shaft and meshes with a first traction transmission intermediate gearwheel arranged on the traction transmission intermediate shaft. The traction transmission drive gearwheel and the first traction transmission intermediate gearwheel thus form with the traction transmission drive shaft and the traction transmission intermediate shaft a first gearwheel stage, by means of which drive power is transmittable from the one of these shafts to the other. A second traction transmission intermediate gearwheel is also arranged on the traction transmission intermediate shaft and meshes with a traction transmission output gearwheel arranged on the traction transmission output shaft. The second traction transmission intermediate gearwheel and the traction transmission output gearwheel thus form with the traction transmission intermediate shaft and the traction transmission output shaft a second gearwheel stage, by means of which drive power is transmittable from the one of these shafts to the other.

The traction transmission housing device has, as main components, a traction transmission housing and a traction transmission cover. In particular, the traction transmission housing and the traction transmission cover are configured to receive bearings, preferably roller bearings, in order to mount the traction transmission drive shaft, traction transmission intermediate shaft and traction transmission output shaft rotatably in relation to the traction transmission housing device. The traction transmission housing is preferably formed in such a way that, in the assembled state of the motor vehicle drive system, in the axial direction of the traction transmission drive shaft, it covers at least one of these gearwheel stages, preferably covers both gearwheel stages. Further preferably, the traction transmission cover is formed as what is known as an end shield. The traction transmission cover may, like the traction transmission housing, be formed as a multi-part component.

In particular, in order to achieve sufficient stiffness of the bearing arrangement of the transmission shafts (traction transmission drive shaft, traction transmission output shaft, traction transmission intermediate shaft), these three traction transmission shafts are each mounted in the traction transmission housing device by means of what is known as a fixed/floating bearing arrangement. In the context of the invention, a fixed/floating bearing arrangement should be understood in particular to mean a bearing arrangement having two bearing points for a shaft in relation to a housing, one of these bearing points being configured to accommodate axial and radial forces and the other to accommodate radial forces, wherein axial and radial should in each case be understood in relation to the axis of rotation of the shaft to be supported and wherein the bearing point at which the axial forces can be accommodated should be understood as fixed bearing. In this case, a single such bearing point may also have multiple bearings, preferably multiple roller bearings, in particular what is known as the fixed bearing may have a radial bearing and an axial bearing.

The term "fixed/floating bearing arrangement" as such is known from the prior art. It is thus also proposed that such a fixed/floating bearing arrangement in each case has at least one fixed bearing for accommodating axial forces, at least two of these fixed bearings being arranged in the traction transmission cover, or being borne and positioned in relation to the traction transmission housing by the traction transmission cover. In particular, in the case of such a design of the motor vehicle drive system, simple mounting of the traction transmission apparatus is enabled.

In a preferred embodiment, all of the fixed bearings provided for supporting the traction transmission drive shaft, traction transmission intermediate shaft and traction transmission output shaft are arranged in this traction transmission cover, or the fixed bearings are borne by the traction transmission cover and are thus positioned and held in relation to the traction transmission housing by the traction transmission cover. In particular, such an embodiment of the invention enables simple mounting of the traction transmission apparatus.

In a preferred embodiment of the invention, the traction transmission drive gearwheel and the first traction transmission intermediate gearwheel mesh with one another for the transmission of drive power and thus form a first traction transmission gearwheel stage. Further preferably, the transverse contact ratio of this first traction transmission gearwheel stage is greater than 1.70, preferably greater than or equal to 1.76, and this transverse contact ratio is preferably less than 1.90, and preferably less than or equal to 1.84. Further preferably, the overlap ratio of the first traction transmission gearwheel stage is greater than 3.10, and the overlap ratio is preferably greater than or equal to 3.16, and this overlap ratio is further preferably less than 3.30, and preferably less than or equal to 3.24. In particular, in combination with the bearing arrangement concept (fixed/floating bearing arrangement) outlined above and the transverse contact ratio and overlap ratio selected in this way, what results is a simple mountability of the traction transmission apparatus and quiet transmission of drive power and at the same time high efficiency in the transmission of power.

In a preferred embodiment of the invention, the second traction transmission intermediate gearwheel and the traction transmission output gearwheel mesh with one another for the transmission of drive power and thus form a second traction transmission gearwheel stage. Further preferably, the transverse contact ratio of this second traction transmission gearwheel stage is greater than 1.40, preferably greater than or equal to 1.46, and this transverse contact ratio is preferably less than 1.60, and preferably less than or equal to 1.54. Further preferably, the overlap ratio of the second traction transmission gearwheel stage is greater than 2.40, and the overlap ratio is preferably greater than or equal to 2.46, and this overlap ratio is further preferably less than 2.50, and preferably less than or equal to 2.54. In particular, in combination with the bearing arrangement concept (fixed/floating bearing arrangement) outlined above and the transverse contact ratio and overlap ratio of the second traction transmission gearwheel stage selected in this way, what results is a simple mountability of the traction transmission apparatus and quiet transmission of drive power and at the same time high efficiency.

In a preferred embodiment, at least two gearwheels of at least one of the two traction transmission gearwheel stages are formed as helically toothed spur gears, which preferably have what is known as an involute toothing, preferably all of the gearwheels of these gearwheel stages are formed as in particular helically toothed spur gears of this kind. In such an embodiment having at least two, preferably having all, helically toothed spur gears, preferably the first traction transmission intermediate gearwheel has a first helical toothing with a first helix angle and the second traction transmission intermediate gearwheel has a second helical toothing with a second helix angle. Furthermore, this first and this second helix angle are directed in opposite directions, such that axial forces occurring during power transmission, in particular owing to these helix angles, at least partially cancel out, or axial forces occurring as a result of the transmission of drive power are directed in opposite directions. In particular, as a result of opposite directions of the axial forces of the first and second traction transmission intermediate gearwheel, the fixed bearing of the fixed/floating bearing arrangement of the traction transmission intermediate shaft is in particular relieved of load and thus its service life is extended and the power loss caused in particular thereby can thus also be reduced.

In a preferred embodiment of the invention, the traction transmission drive shaft is mounted in the traction transmission housing device by means of a fixed/floating bearing arrangement, that is to say a bearing arrangement having a fixed bearing at least for accommodating axial forces and a floating bearing. Preferably, at least one of these bearings of this fixed/floating bearing arrangement is arranged only indirectly on the traction transmission drive shaft, preferably the traction transmission drive shaft is received in a further shaft and this floating bearing of the fixed/floating bearing arrangement of the traction transmission drive shaft is received on this further shaft or is configured to support this further shaft and thus indirectly to support the traction transmission drive shaft. Preferably, the traction transmission drive shaft is connected for conjoint rotation to this further shaft and preferably by means of a form-fitting shaft/hub connection, and particularly preferably a fit, preferably a transition fit and preferably an interference fit, is provided for positioning the traction transmission drive shaft in relation to the further shaft.

Preferably, the floating bearing of the fixed/floating bearing arrangement of the traction transmission drive shaft is thus configured as what is known as a common floating bearing for the traction transmission drive shaft and for this further shaft, and in particular such a design of the bearing arrangement of the traction transmission drive shaft enables particularly efficient supporting of this shaft.

Further preferably, a roller bearing having balls as rolling elements is provided as fixed bearing of this fixed/floating bearing arrangement of the traction transmission drive shaft, and further preferably this bearing is formed as what is known as a four-point bearing and preferably as what is known as a deep groove ball bearing. Further preferably, this fixed bearing also forms, in particular by way of the connection of the traction transmission drive shaft to this further shaft, the fixed bearing for this further shaft.

Further preferably, a roller bearing having cylindrical rolling elements or preferably having balls is provided as floating bearing of this fixed/floating bearing arrangement of the traction transmission drive shaft. Preferably, this floating bearing is formed as a cylindrical roller bearing and preferably as a deep groove ball bearing. In a preferred embodiment, both the fixed bearing and the floating bearing of the bearing arrangement of the traction transmission drive shaft are formed as deep groove ball bearings. In particular, in an embodiment with such roller bearings, high efficiency during power transmission is achievable. Preferably, the fixed bearing of the bearing arrangement of the traction transmission drive shaft is arranged in the traction transmission cover and in particular fixed therein.

Further preferably, the traction transmission housing is formed in such a way that the electric drive machine is arranged on or in the traction transmission housing. In particular, such a design makes it possible to achieve simple mountability of the motor vehicle drive system and high efficiency when transmitting drive power.

In a preferred embodiment of the motor vehicle drive system, the traction transmission intermediate shaft is mounted in the traction transmission housing device by means of a fixed/floating bearing arrangement, that is to say by means of a bearing arrangement having a fixed bearing for accommodating axial forces and a floating bearing. Further preferably, a roller bearing having balls as rolling elements is provided as fixed bearing of this fixed/floating bearing arrangement of the traction transmission intermediate shaft, and further preferably this bearing is formed as what is known as a four-point bearing and preferably as what is known as a deep groove ball bearing. Further preferably, a roller bearing having cylindrical rolling elements or preferably having balls is provided as floating bearing of this fixed/floating bearing arrangement of the traction transmission intermediate shaft. Preferably, this floating bearing is formed as a cylindrical roller bearing and preferably as a deep groove ball bearing. In a preferred embodiment, both the fixed bearing and the floating bearing of the bearing arrangement of the traction transmission intermediate shaft are formed as deep groove ball bearings. In particular, in an embodiment with such roller bearings, high efficiency during power transmission is achievable. Preferably, the fixed bearing of the bearing arrangement of the traction transmission drive shaft is arranged in the traction transmission cover.

In a preferred embodiment, the traction transmission output shaft is mounted in the traction transmission housing device by means of a fixed/floating bearing arrangement. Further preferably, this fixed/floating bearing arrangement has, in particular for accommodating axial forces, a fixed bearing, or a fixed bearing point, and at least one floating bearing. Preferably, the fixed/floating bearing arrangement for supporting the traction transmission output shaft has, in particular two or more, roller bearings, wherein the rolling elements of at least two of these roller bearings are formed as cylindrical rolling elements and these roller bearings are thus preferably formed as cylindrical roller bearings. Preferably, the fixed/floating bearing arrangement of the traction transmission output shaft also has, in addition to two cylindrical roller bearings, a roller bearing formed as a fixed bearing, preferably a roller bearing having balls as rolling elements. Further preferably, the fixed bearing of the bearing arrangement of the traction transmission output shaft is formed as a deep groove ball bearing, preferably as a four-point bearing. This fixed bearing is in particular radially free, or in other words the bearing seat, configured to receive this fixed bearing, on the traction transmission output shaft has a smaller diameter than a bearing inner ring of this fixed bearing, or further preferably the bearing seat, configured to receive this fixed bearing, in the traction transmission housing device has a greater diameter than the bearing outer diameter of this fixed bearing. Further preferably, these cylindrical roller bearings of the fixed/floating bearing arrangement of the traction transmission output shaft are arranged in an axial direction on different sides of the traction transmission output gearwheel. Further preferably, the fixed bearing, that is to say in particular the deep groove ball bearing or the four-point bearing, of the bearing arrangement of the traction transmission output shaft is arranged in the traction transmission cover. In particular, such a design makes it possible to realize efficient and stable supporting of the traction transmission output shaft.

A motor vehicle is also proposed which has at least one motor vehicle drive system of the proposed type of construction. In particular, the motor vehicle drive system is configured to drive the motor vehicle in a main direction of travel and preferably also in the opposite direction thereto, this main direction of travel being understood to mean the direction of forward travel of a passenger car. Preferably, the motor vehicle is drivable with only a single one of these motor vehicle drive systems and is thus formed as a motor vehicle with front-wheel or rear-wheel drive, and further preferably the motor vehicle is equipped with two of these motor vehicle drive systems and is thus formed as an all-wheel-drive vehicle.

In a preferred embodiment, at least the second traction transmission gearwheel stage is formed as a helically toothed gearwheel stage. In particular, the traction transmission output gearwheel has an output helical toothing with an output helix angle and is thus formed as a helically toothed spur gear. Further preferably, the output helix angle is selected in such a way that the axial force of the traction transmission output gearwheel, the axial force being produced during driving of the motor vehicle in the direction of forward travel as a result of the helical toothing of the traction transmission output gearwheel, is directed in the direction of the traction transmission output shaft extent, that is to say in the axial direction from the traction transmission cover to the traction transmission housing. In particular, such a design enables efficient transmission of drive forces, with high comfort, and at the same time the motor vehicle drive system can be produced in a simply mountable and thus cost-effective manner.

In other words, a basic concept of the invention is that the contact ratios of the toothing of the first spur-gear stage (first traction transmission gearwheel stage) and of the second spur-gear stage (second traction transmission gearwheel stage) are selected so as to achieve high efficiency while simultaneously providing good comfort during the transmission of drive power, in particular good acoustics. For the proposed motor vehicle drive system, the toothings of the first and of the second traction transmission gearwheel stage are designed such that the contact ratios of these toothings are preferably as follows:

first traction transmission gearwheel stage: transverse contact ratio in the range of 1.76-1.84; overlap ratio in the range of 3.16-3.24:

second traction transmission gearwheel stage: transverse contact ratio in the range of 1.46-1.54; overlap ratio in the range of 2.46-2.54.

It is also proposed that the direction of the helix of the toothing of the second traction transmission gearwheel stage is preferably selected such that the resulting axial force of the traction transmission output gearwheel is directed in the motor forward travel of the motor vehicle to the traction transmission housing. It is also proposed that the traction transmission output gearwheel is preferably formed as what is known as a final drive gearwheel. In the context of the invention, what is known as the final drive gearwheel should be understood to mean a gearwheel in which an axle differential of a motor vehicle drive axle is received, or which is connected for conjoint rotation to a differential cage of such an axle differential.

Furthermore, the traction transmission drive gearwheel, and thus also the first traction transmission intermediate gearwheel, is preferably formed as a helically toothed spur gear, as are preferably also the traction transmission output gearwheel and the second traction transmission intermediate gearwheel. It is also proposed that the direction of the helix of the toothing of the first traction transmission gearwheel stage can preferably be selected such that the axial forces of the gearwheel of the first traction transmission gearwheel stage and of the gearwheel of the second traction transmission gearwheel stage act on the traction transmission intermediate shaft in opposite axial directions, and these axial forces thus at least partially cancel one another out.

It is also proposed that a fixed/floating bearing arrangement can be used for supporting the traction transmission intermediate shaft, as in the case of the traction transmission output shaft, and the traction transmission drive shaft can additionally also be mounted by means of such a fixed/floating bearing arrangement, wherein in particular the floating bearing of the bearing arrangement of the traction transmission drive shaft can be used simultaneously as bearing for a further shaft such as the output shaft of an electric drive machine, preferably the rotor shaft.

Furthermore, a particular geometrical arrangement of the transmission shafts (traction transmission drive shaft, traction transmission intermediate shaft and traction transmission output shaft) is proposed in dependence on the planned direction of forward travel and the resultant direction of rotation of the traction transmission drive shaft. Boundary conditions to be observed for the arrangement of components result from the installation space requirements in a motor vehicle, in which certain functions have to be provided, in this case drive function. Furthermore, the quality of the performance of the function can be dependent on the arrangement of the components, in the present case in particular the aforementioned transmission shafts, in the predefined installation space; for the mentioned reasons, two alternatives for the arrangement of this transmission shaft are proposed.

The first of these alternatives thus constitutes a preferred embodiment of the invention, in which, in relation to this direction of forward travel of the motor vehicle in the plane and when the motor vehicle drive system is in the planned installation position, the traction transmission drive shaft is arranged upstream of the traction transmission intermediate shaft, and, furthermore, in this first alternative the traction transmission output shaft is arranged downstream of the traction transmission intermediate shaft.

Further preferably, in this embodiment, in relation to the direction of forward travel, in a viewing direction from the right, orthogonally (in relation to an axis of rotation of the traction transmission drive shaft) on an end side of the traction transmission drive shaft, the direction of rotation of this transmission shaft for generation of a movement of the motor vehicle in the direction of forward travel is directed clockwise, and thus the traction transmission intermediate shaft has a direction of rotation in the opposite direction and the traction transmission output shaft rotates in the same direction as the traction transmission drive shaft. In particular, such an embodiment of the invention makes it possible to achieve low displacement of the gearwheels involved in the transmission of drive forces and thus efficient and reliable transmission of drive forces by means of the motor vehicle drive system in the planned direction of forward travel is achievable.

In a preferred embodiment of the invention, in relation to this direction of forward travel in the plane and when the motor vehicle drive system is in the planned installation position, the traction transmission intermediate shaft is arranged geometrically higher than the traction transmission drive shaft, and further preferably the traction transmission output shaft is arranged lower than the traction transmission intermediate shaft and the traction transmission output shaft is preferably also arranged lower than the traction transmission drive shaft. In particular, such a design produces low displacements of the gearwheels involved in the transmission of drive forces and thus efficient and reliable transmission of these drive forces by means of the motor vehicle drive system in the planned direction of forward travel is achievable.

The second of these alternatives constitutes a further preferred embodiment of the invention, in which, in relation to this direction of forward travel in the plane and when the motor vehicle drive system is in the planned installation position, the traction transmission drive shaft is arranged downstream of the traction transmission intermediate shaft, and further preferably the traction transmission output shaft is arranged upstream of the traction transmission intermediate shaft.

Further preferably, in this embodiment (second alternative), in relation to the direction of forward travel, in a viewing direction from the left, orthogonally (in relation to an axis of rotation of the traction transmission drive shaft) on an end side of the traction transmission drive shaft, the direction of rotation of this transmission shaft for generation of a movement of the motor vehicle in the direction of forward travel is directed anticlockwise, and thus the traction transmission intermediate shaft has a direction of rotation in the clockwise direction and the traction transmission output shaft rotates in the same direction as the traction transmission drive shaft.

Further preferably, in this embodiment, in relation to this direction of forward travel in the plane and when the motor vehicle drive system is in the planned installation position, the traction transmission intermediate shaft is arranged lower than the traction transmission output shaft, and preferably the traction transmission drive shaft is arranged higher than the traction transmission output shaft, and further preferably the traction transmission drive shaft is arranged higher than the traction transmission intermediate shaft. In particular, such an embodiment of the invention makes it possible to achieve low displacement of the gearwheels involved in the transmission of drive forces and low development of noise during power transmission by means of the traction transmission stages and thus efficient and reliable transmission of drive forces by means of the motor vehicle drive system in the planned direction of forward travel is achievable.

Further preferably, in this embodiment, in relation to this direction of forward travel in the plane and when the motor vehicle drive system is in the planned installation position, the traction transmission intermediate shaft is arranged higher than the traction transmission output shaft, and preferably the traction transmission drive shaft is arranged higher than the traction transmission output shaft, and further preferably the traction transmission drive shaft is arranged lower than the traction transmission intermediate shaft. In particular, such an embodiment of the invention makes it possible to achieve low displacement of the gearwheels involved in the transmission of drive forces and a low center of gravity for the motor vehicle drive system and thus efficient and reliable transmission of drive forces by means of the motor vehicle drive system in the planned direction of forward travel is achievable.

Individual features and embodiments of the invention will be discussed in more detail below on the basis of the figures.

DETAILED DESCRIPTION OF THE DRAWINGS

Figure 1:
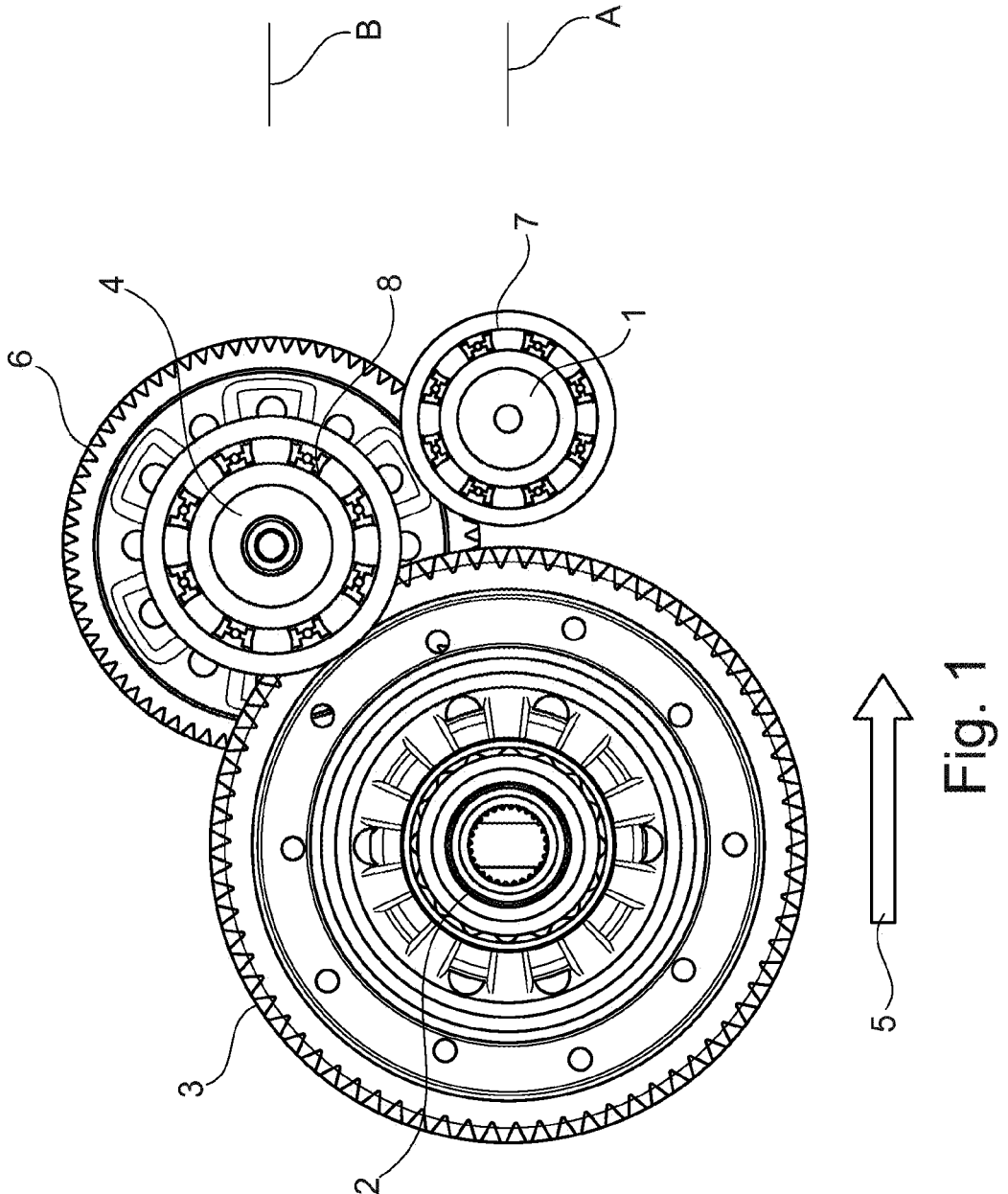
FIG. 1 is a schematic cross-sectional illustration of the proposed motor vehicle drive system orthogonally with respect to the traction transmission drive shaft.

FIG. 1 shows a cross section through a motor vehicle drive system, that is to say a section orthogonal to the traction transmission drive shaft 1 at the height of the gear set of the traction transmission. In the case of such a motor vehicle drive system, the electromechanical energy converter is embodied as an electric drive machine (not illustrated). From the electric drive machine, drive power for driving a motor vehicle is transmittable via the traction transmission apparatus (illustrated in section) to a motor vehicle axle drive, in particular to the traction transmission output shaft 2 and the traction transmission output gear wheel 3. The traction transmission drive shaft 1 and the traction transmission output shaft 2 of the traction transmission apparatus are rotatably mounted in the traction transmission housing device (not illustrated). The traction transmission drive shaft 1 is connected for conjoint rotation to the electric drive machine, in particular to the rotor shaft of such a machine, by means of a shaft/hub connection.

Furthermore, the traction transmission apparatus has the traction transmission intermediate shaft 4, which is also rotatably mounted in the traction transmission housing device. The transmission shafts of the traction transmission apparatus are each arranged axially parallel to one another and at a radial spacing from one another and in the present case are illustrated in the planned installation position in a motor vehicle. Furthermore, the planned direction of forward travel 5 is shown in relation to this installation situation. A traction transmission drive gearwheel 19 is arranged on the traction transmission drive shaft 1 and meshes with a first traction transmission intermediate gearwheel 6. The traction transmission drive gearwheel 19 is not visible in the sectional illustration shown in FIG. 1, since this lies behind the traction transmission drive shaft fixed bearing 7. Furthermore, a second traction transmission intermediate gearwheel 20 is arranged on the traction transmission intermediate shaft 4 and meshes with the traction transmission output gearwheel 3 arranged on the traction transmission output shaft 2.

The illustrated three traction transmission shafts (traction transmission drive shaft 1, traction transmission intermediate shaft 4, traction transmission output shaft 2) are each mounted in the traction transmission housing device by means of a fixed/floating bearing arrangement and are each connected for conjoint rotation to the transmission shaft on which these are arranged. A bearing arrangement of the described type as such is known from the prior art for the supporting of transmission shafts and has at least one fixed bearing for receiving axial forces. In the proposed motor vehicle drive system, at least two of these fixed bearings are arranged in the traction transmission cover, which forms together with the traction transmission housing the traction transmission housing device, or is a constituent part thereof.

Figure 2:
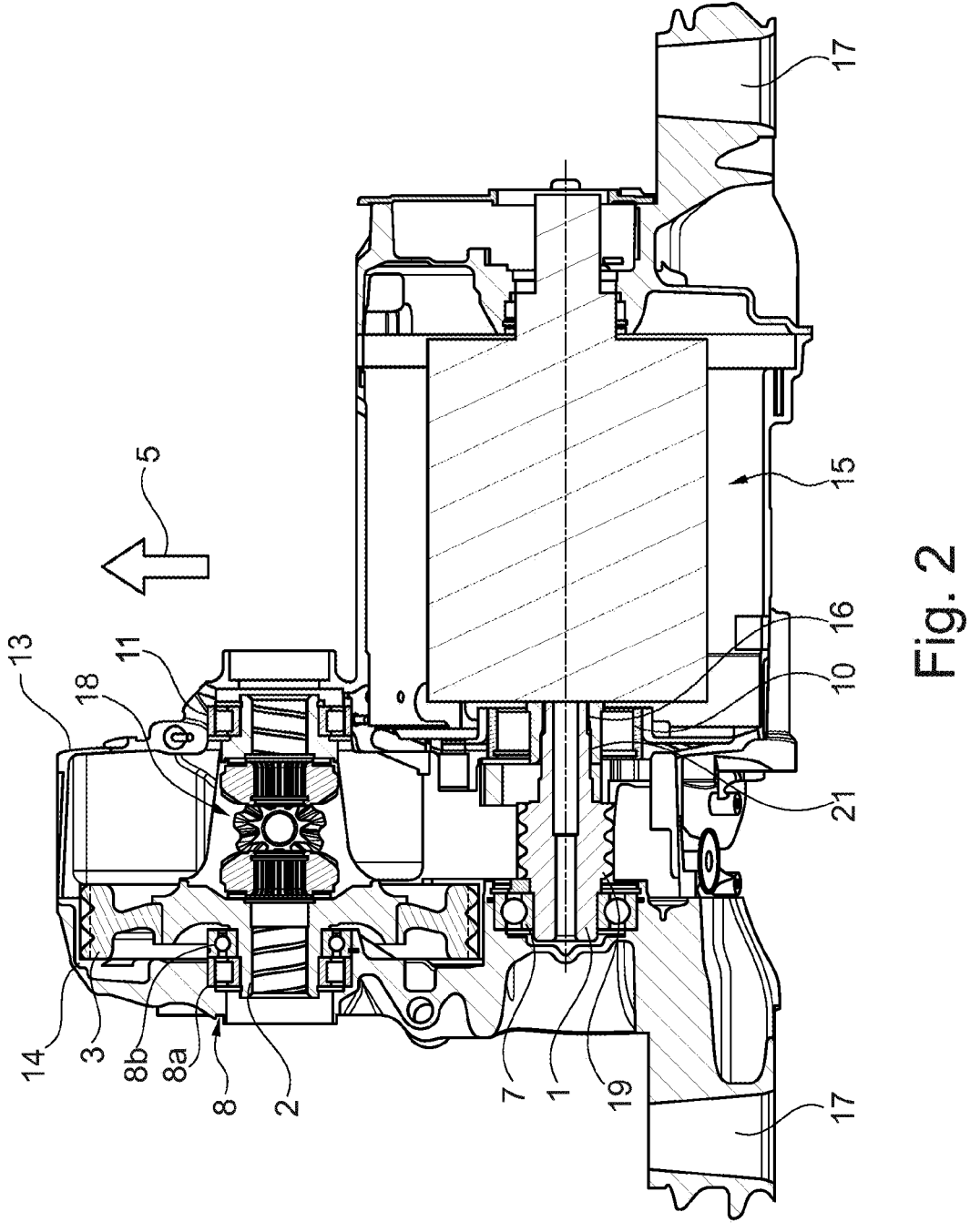
FIG. 2 is a first longitudinal sectional illustration of the proposed motor vehicle drive system parallel to the traction transmission drive shaft.

FIG. 2 illustrates a longitudinal sectional illustration of the motor vehicle drive system, the section plane A in FIG. 1 being visible. The drive power is provided by the electric drive machine 15, which is received in the traction transmission housing device 13, 14, the traction transmission housing device being illustrated only in part.

The output shaft of the electric drive machine 15 is connected for conjoint rotation directly to the traction transmission drive shaft 1 by way of a shaft/hub connection 16.

The traction transmission drive shaft 1 is rotatably mounted in the traction transmission housing device 13, 14. The traction transmission drive shaft fixed bearing 7 is arranged in the traction transmission cover 14 and accommodates axial forces occurring at the traction transmission drive shaft 1. Furthermore, the traction transmission drive shaft 1 is mounted in the traction transmission housing 13 by way of the traction transmission drive shaft floating bearing 10. In terms of construction, the traction transmission drive shaft floating bearing 10 is embodied as a common bearing of the electric drive machine 15 and of the traction transmission drive shaft 1, wherein centering of the drive shaft of the electric drive machine 15 and of the traction transmission drive shaft 1 is achieved by way of a traction transmission drive shaft centering seat 21, a bearing arrangement having three bearings can thus be used for the supporting of these two shafts and thus improved efficiency compared with independent supporting of both shafts with in each case two roller bearings is achievable.

The traction transmission drive gearwheel 19, which is arranged on the traction transmission drive shaft 1, meshes with the first traction transmission intermediate gearwheel, which is not illustrated in this sectional illustration, for the transmission of drive power. The traction transmission housing device 13, 14 is connected to the motor vehicle structure (not illustrated) by way of the assembly bearing 17 and is thus positioned in the motor vehicle.

By way of the traction transmission intermediate shaft, which is not in the illustrated section plane A and therefore is not illustrated in FIG. 2, drive power is transmitted from the traction transmission drive shaft 1 to the traction transmission output shaft 2. The traction transmission output gearwheel 3 is arranged on the traction transmission output shaft 2, is formed as a final drive gearwheel and transmits the drive power to the axle differential 18. The traction transmission output shaft 2 is rotatably mounted in the traction transmission housing device 13, 14 by way of a fixed/floating bearing arrangement. The fixed-bearing device 8 of the traction transmission output shaft 2 is received in the traction transmission cover 14 and has a traction transmission output shaft radial bearing 8a and a traction transmission output shaft axial bearing 8b. The traction transmission output shaft axial bearing 8b is radially free in relation to the traction transmission cover 14, such that it transmits no radial forces between the traction transmission output shaft 2 and the traction transmission cover, furthermore the traction transmission output shaft axial bearing 8b is formed as a four-point bearing and has a common outer ring with the traction transmission output shaft radial bearing 8a, which is formed as a cylindrical roller bearing. The traction transmission output shaft floating bearing 11 is received in the traction transmission housing and is formed as a cylindrical roller bearing. During driving of the motor vehicle in the direction of forward travel 5, the favorable force ratios are set by the helical toothings at the traction transmission shaft 1, 2, 4, such that efficient operation of the motor vehicle drive system is enabled.

Figure 3:
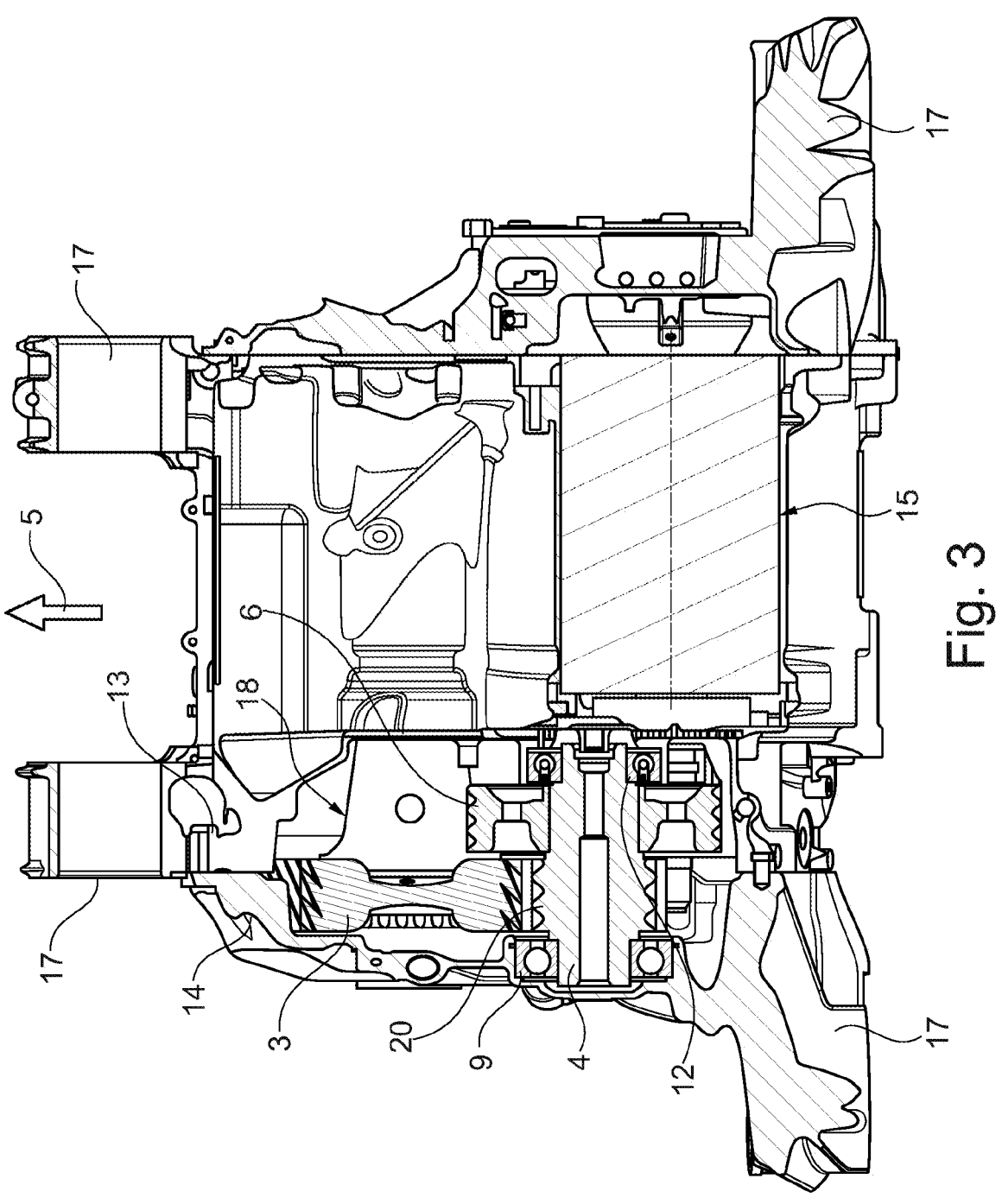
FIG. 3 is a second longitudinal sectional illustration of the proposed motor vehicle drive system parallel to the traction transmission intermediate shaft.

FIG. 3 illustrates a further longitudinal section of the motor vehicle drive system, this longitudinal section illustrating a section in the section plane B (see FIG. 1). The motor vehicle drive system is connected to the motor vehicle structure (not illustrated) by way of the assembly bearing 17 and is configured to drive a motor vehicle in the direction of forward travel 5 and in the opposite direction (rearward). The electric drive machine 15 provides by way of the traction transmission intermediate shaft 4, which is arranged between the traction transmission drive shaft 1 and the traction transmission output shaft 2 in relation to the power transmission from the electric drive machine 15. To transfer the drive power by means of the traction transmission intermediate shaft 4, the latter has the first traction transmission intermediate gearwheel 6 and the second traction transmission intermediate gearwheel 20, the first traction transmission intermediate gearwheel 6 meshing with the traction transmission drive gearwheel 19 and the second traction transmission intermediate gearwheel 20 meshing with the traction transmission output gearwheel 3 for the transmission of power.

The traction transmission intermediate shaft is also mounted in the traction transmission housing device 13, 14 by means of a fixed/floating bearing arrangement, just like the traction transmission drive shaft 1 and the traction transmission output shaft 2, and the fixed bearing is also arranged in the traction transmission cover 14 in the case of the traction transmission intermediate shaft 4. The traction transmission intermediate shaft fixed bearing 9, just like the traction transmission intermediate shaft floating bearing 12, is formed as a deep groove ball bearing. The traction transmission intermediate shaft fixed bearing is configured to accommodate axial forces at the traction transmission intermediate shaft 4 and is, to this end, fixed in the traction transmission cover 14. The traction transmission intermediate shaft floating bearing 12 is received in an axially displaceable manner in the traction transmission housing 13.

Figure 4:
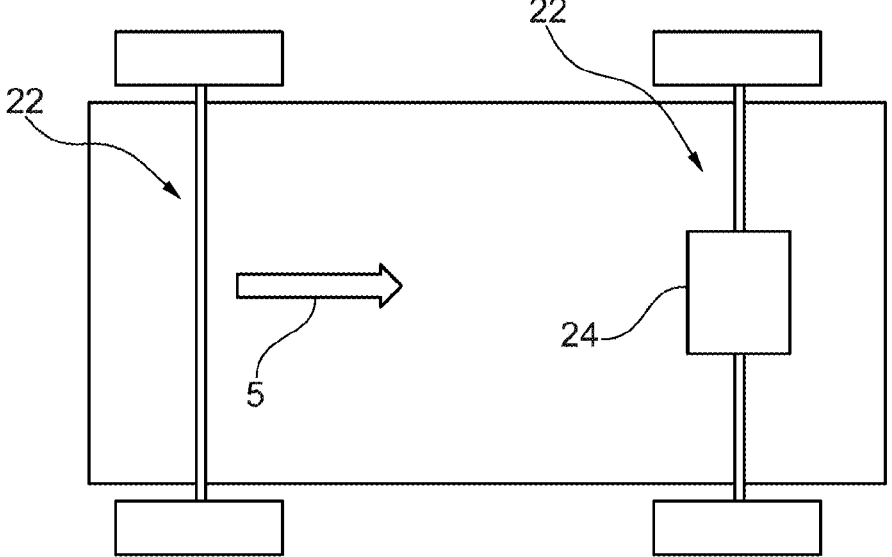
FIG. 4 is a highly schematic top view of a motor vehicle having the proposed motor vehicle drive system.

FIG. 4 depicts a highly schematic top view of a motor vehicle having the proposed motor vehicle drive system 24. The motor vehicle drive system 24 can be used to supply drive power to the driven front axle 22, such that the motor vehicle is drivable in the direction of forward travel 5 or opposite to this direction, that is to say rearward. Furthermore, the motor vehicle has a non-driven rear axle 22, such that the illustrated motor vehicle is thus formed as a front-wheel-drive vehicle.

Figures 5A, 5B:
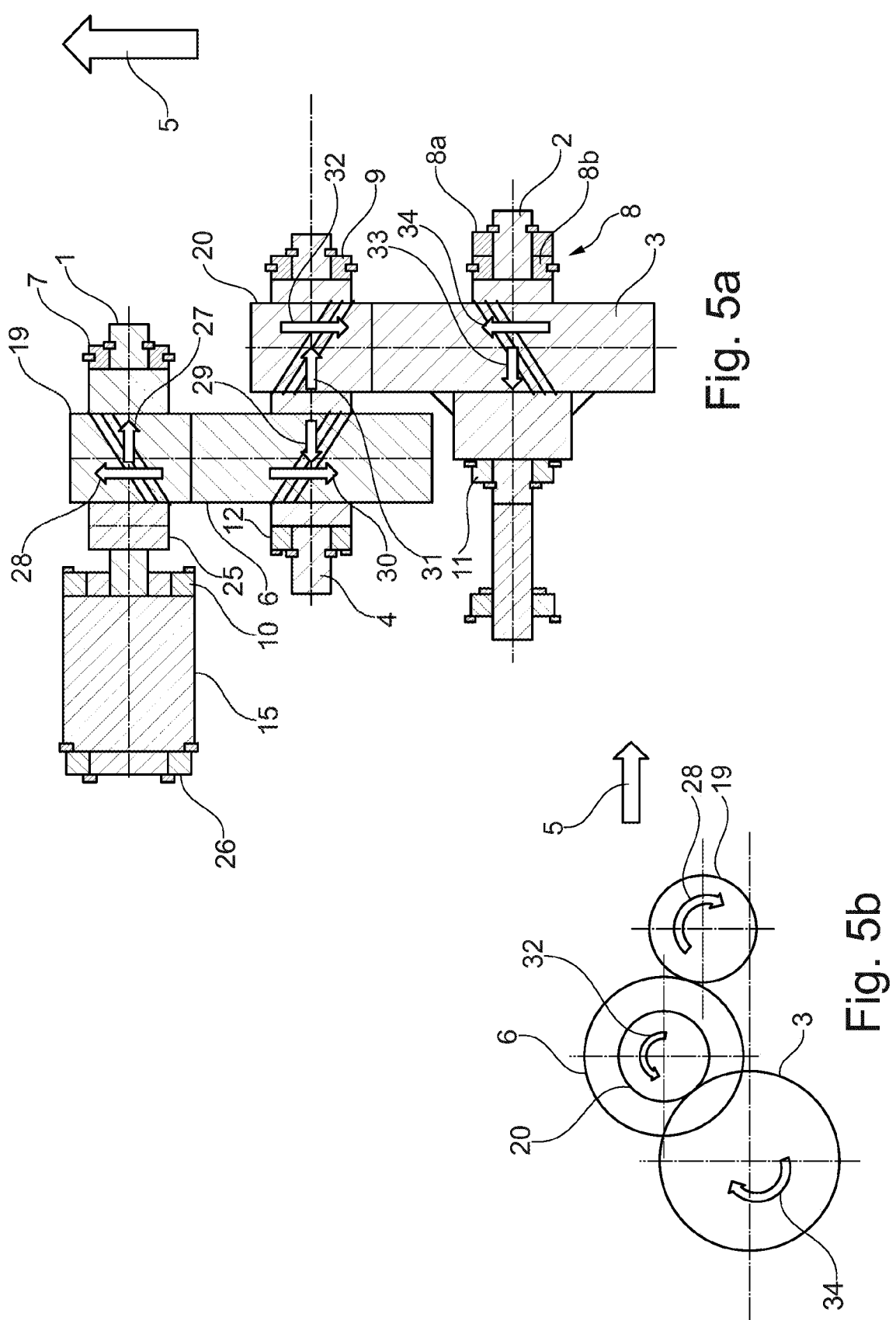
FIG. 5a is a schematic top view of the motor vehicle drive system in a first embodiment.
FIG. 5b is a schematic side view of the motor vehicle drive system in the first embodiment in a planned installation position.

FIG. 5a illustrates a schematic top view of a first embodiment of the motor vehicle drive system. The drive of a motor vehicle is effected by way of the electric drive machine 15, of which in the present case only the rotor, or the rotor shaft, is illustrated. The electric drive machine 15 has a rotor shaft bearing 26, which is formed as a floating bearing. Furthermore, a parking lock gear 25 is arranged on the traction transmission drive shaft 1, in particular in order to enable mechanical locking of the motor vehicle drive system. The traction transmission drive shaft 1 is connected for conjoint rotation to the rotor shaft of the electric drive machine 15 by means of a shaft/hub connection, and thus the traction transmission drive shaft floating bearing is used as floating bearing of the bearing arrangement of the traction transmission drive shaft and is arranged on the rotor shaft of the electric drive machine.

In the illustrated view, the direction of rotation for the traction transmission drive gearwheel 19 and thus the traction transmission drive shaft 1 is in the planned direction of forward travel 5, in the direction of arrow 28, the helix angle of this traction transmission drive gearwheel 19 being selected in such a way that the resulting axial force is set in the direction of arrow 27 and is thus directed against the traction transmission drive shaft fixed bearing 7. For the transmission of drive power, the traction transmission drive gearwheel 19 meshes with the first traction transmission intermediate gearwheel 6 for which the direction of rotation is set in the direction of arrow 30 and an axial force in the direction of arrow 29, the traction transmission intermediate shaft 4 thus has the same direction of rotation (direction of arrow 30). The helix angle of the second traction transmission intermediate gearwheel 20 is selected such that the resulting axial force at the second traction transmission intermediate gearwheel 20 during power transmission occurs, for the planned direction of forward travel 5, in the direction of arrow 31 and thus counter to the axial force at the first traction transmission intermediate gearwheel (direction of arrow 29), such that these axial forces at least partially cancel out on the traction transmission intermediate shaft 4. The traction transmission intermediate shaft 4 is rotatably mounted by means of the traction transmission intermediate shaft fixed bearing 9 and the traction transmission intermediate shaft floating bearing 12.

For the transmission of power, the second traction transmission intermediate shaft gearwheel 20 meshes with the traction transmission output gearwheel 3 on the traction transmission output shaft 2, thus, for the provision of drive power for the planned direction of forward travel 5, a direction of rotation of the traction transmission output shaft is set in the direction of arrow 34 and an axial force occurs in the direction of arrow 33. The traction transmission output shaft 2 is mounted by means of the traction transmission output shaft fixed-bearing device 8, which has the traction transmission output shaft radial bearing 8a and the traction transmission output shaft axial bearing 8b, and the traction transmission output shaft floating bearing 11.

Figures 6A, 6B:
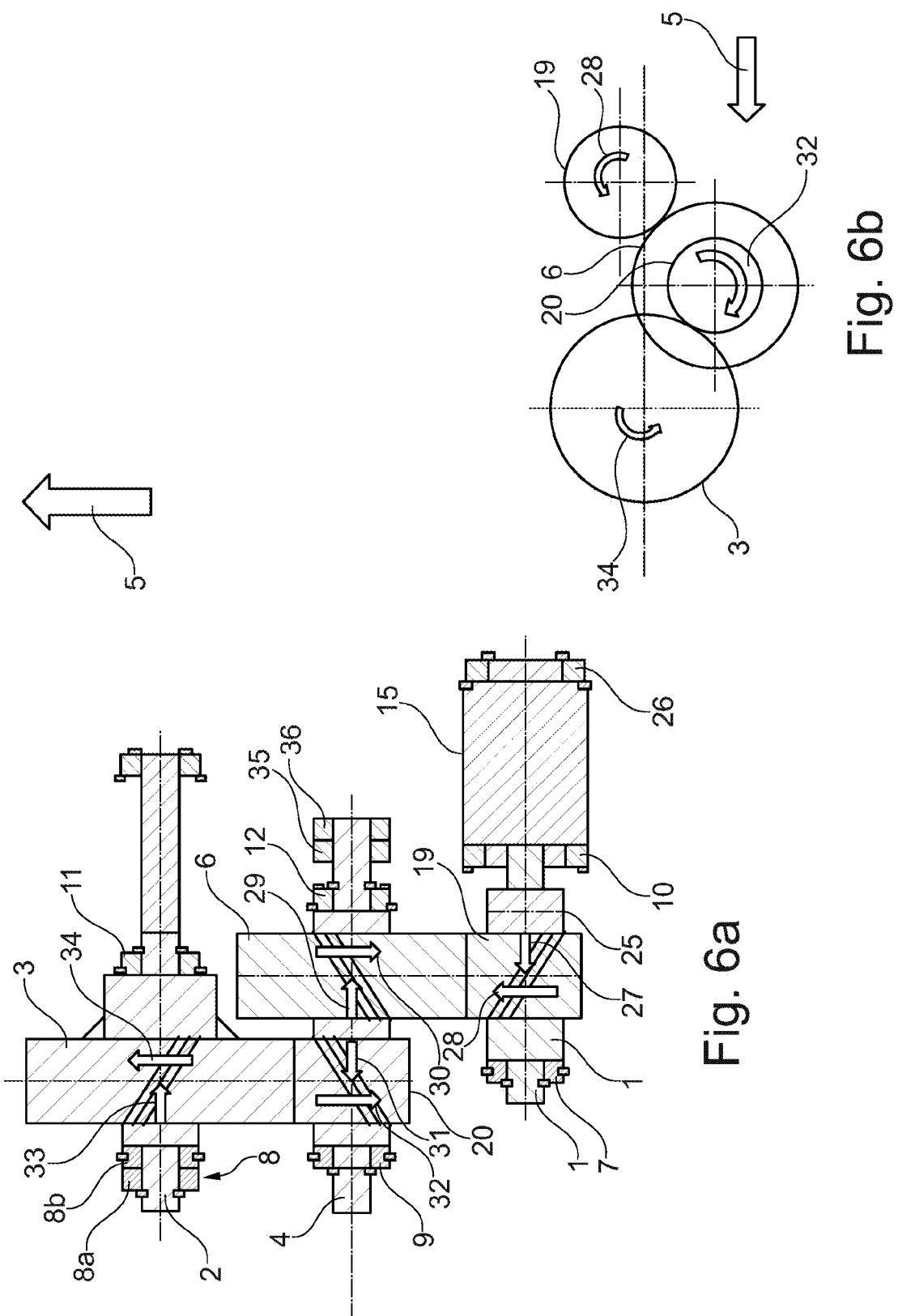
FIG. 6a is a schematic top view of the motor vehicle drive system in a second embodiment.
FIG. 6b is a schematic side view of the motor vehicle drive system in the second embodiment in a planned installation position.

FIG. 6a illustrates a schematic top view of a second embodiment of the motor vehicle drive system, in contrast to the first embodiment (FIGS. 5a and 5b) in which the electric drive machine 15 is arranged at the front in the planned direction of forward travel 5, the electric drive machine is arranged at the rear in the second embodiment. The drive of a motor vehicle is also effected by way of the electric drive machine 15, of which in the present case only the rotor, or the rotor shaft, is illustrated.

Below, essentially the differences between the first (FIGS. 5a/5b) and the second embodiment (FIGS. 6a/6b) of the proposed motor vehicle drive system are discussed. The traction transmission intermediate shaft 4, which in the first embodiment is the uppermost transmission shaft in relation to the axis of rotation thereof, is the lowermost transmission shaft in the second embodiment, in relation to the planned installation position, in particular in relation to a planar roadway surface.

Furthermore, a grounding ring 35 and a radial shaft sealing ring 36 are arranged on the traction transmission intermediate shaft 4, and these can also be used in the first embodiment. As mentioned, the helix angles of the gearwheels are selected such that the axial forces during driving in the planned direction of forward travel are directed against the traction transmission drive shaft fixed bearing 8 and that the axial forces at least partially cancel out, that is to say have opposite directions, on the traction transmission intermediate shaft 4 in this drive mode.

Figures 7A, 7B:
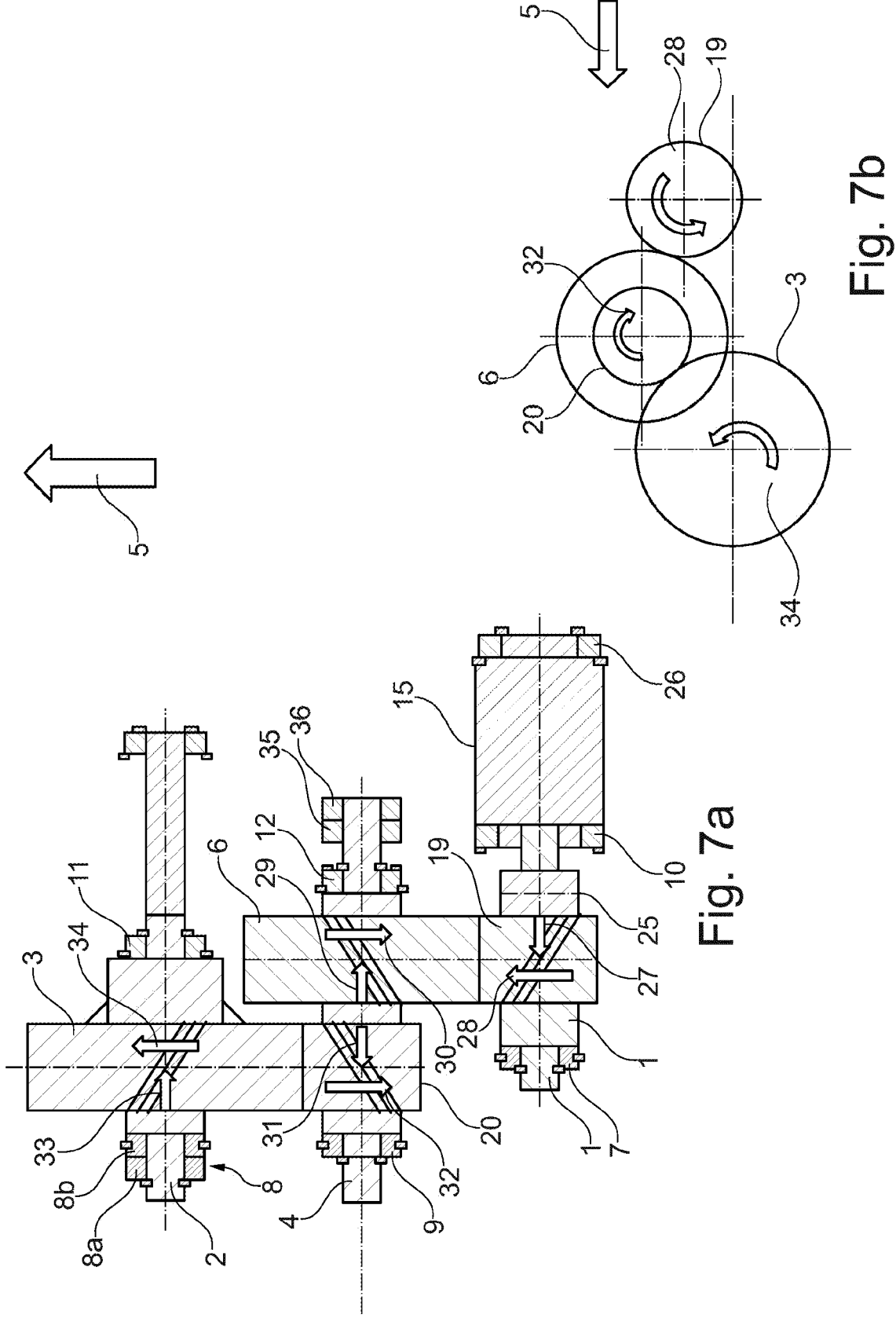
FIG. 7a is a schematic top view of the motor vehicle drive system in a modified variant of this second embodiment.
FIG. 7b is a schematic side view of the motor vehicle drive system of this modified variant of this second embodiment in a planned installation position.

FIGS. 7a and 7b illustrate a variation of the second embodiment of the motor vehicle drive system illustrated in FIGS. 6a and 6b. In this variation, the traction transmission intermediate shaft 4 is not the transmission shaft of the traction transmission apparatus that is arranged lowest down, but rather is arranged above the traction transmission drive shaft 1 and above the traction transmission output shaft 2, and the traction transmission drive shaft is arranged above the traction transmission output shaft 2 but below the traction transmission intermediate shaft 4. Otherwise, reference is essentially made to the explanations relating to the second embodiment of the motor vehicle drive system illustrated in FIGS. 6a and 6b.

| List of reference designations | |
|---|---|
| A | Traction transmission drive shaft section plane |
| B | Traction transmission intermediate shaft section plane |
| 1 | Traction transmission drive shaft |
| 2 | Traction transmission output shaft |
| 3 | Traction transmission output gearwheel |
| 4 | Traction transmission intermediate shaft |
| 5 | Direction of forward travel |
| 6 | First traction transmission intermediate gearwheel |
| 7 | Traction transmission drive shaft fixed bearing |
| 8 | Traction transmission output shaft fixed-bearing device |
| 8a | Traction transmission output shaft radial bearing |
| 8b | Traction transmission output shaft axial bearing |
| 9 | Traction transmission intermediate shaft fixed bearing |
| 10 | Traction transmission drive shaft floating bearing |
| 11 | Traction transmission output shaft floating bearing |
| 12 | Traction transmission intermediate shaft floating bearing |
| 13 | Traction transmission housing |
| 14 | Traction transmission cover |
| 15 | Electric drive machine |
| 16 | Shaft/hub connection between 15 and 1 |
| 17 | Assembly bearing |
| 18 | Axle differential |
| 19 | Traction transmission drive gearwheel |
| 20 | Second traction transmission intermediate gearwheel |
| 21 | Traction transmission drive shaft centering seat |
| 22 | Driven front axle |
| 23 | Non-driven rear axle |
| 24 | Motor vehicle drive system |
| 25 | Parking lock gear |
| 26 | Rotor shaft bearing |
| 27 | Direction of arrow (axial force from toothing on the traction transmission drive shaft during driving in planned direction of forward travel) |
| 28 | Direction of arrow (direction of rotation of the traction transmission drive shaft during driving in planned direction of forward travel) |
| 29 | Direction of arrow (axial force from toothing of the first traction transmission intermediate gearwheel on the traction transmission intermediate shaft during driving in planned direction of forward travel) |
| 30/32 | Direction of arrow (direction of rotation of the traction transmission intermediate shaft during driving in planned direction of forward travel) |
| 31 | Direction of arrow (axial force from toothing of the second traction transmission intermediate gearwheel on the traction transmission intermediate shaft during driving in planned direction of forward travel) |
| 33 | Direction of arrow (axial force from toothing on the traction transmission output shaft during driving in planned direction of forward travel) |
| 34 | Direction of arrow (direction of rotation of the traction transmission output shaft during driving in planned direction of forward travel) |
| 35 | Grounding ring |
| 36 | Radial shaft sealing ring |

The invention claimed is:

1. A motor vehicle drive system, comprising:

an electromechanical energy converter as an electric drive machine;

a traction transmission apparatus for transmitting drive power to a motor vehicle axle drive, wherein the traction transmission apparatus comprises:

a traction transmission housing device, wherein a traction transmission drive shaft is rotatably mounted in the traction transmission housing device and is connected for conjoint rotation, or is selectively connectable for conjoint rotation, to the electric drive machine, a traction transmission intermediate shaft, which is rotatably mounted in the traction transmission housing device and which is arranged axially parallel to and at a radial spacing from the traction transmission drive shaft, a traction transmission output shaft, which is rotatably mounted in the traction transmission housing device and which is arranged axially parallel to and at a radial spacing from the two other traction transmission shafts, a traction transmission drive gearwheel arranged on the traction transmission drive shaft and meshing with a first traction transmission intermediate gearwheel arranged on the traction transmission intermediate shaft, and a second traction transmission intermediate gearwheel arranged on the traction transmission intermediate shaft and meshing with a traction transmission output gearwheel arranged on the traction transmission output shaft, and wherein the traction transmission housing device has a traction transmission housing and a traction transmission cover, wherein the traction transmission drive shaft is mounted in the traction transmission housing device via a first fixed/floating bearing arrangement having a first fixed bearing configured to accommodate axial forces on the traction drive shaft and a first floating bearing configured to accommodate radial forces on the traction drive shaft, wherein the traction transmission intermediate shaft is mounted in the traction transmission housing device via a second fixed/floating bearing arrangement having a second fixed bearing configured to accommodate axial forces on the traction transmission intermediate shaft and a second floating bearing configured to accommodate radial forces on the traction transmission intermediate shaft, wherein the traction transmission output shaft is mounted in the traction transmission housing device via a third fixed/floating bearing arrangement having a third fixed bearing configured to accommodate axial forces on the traction transmission output shaft and a third floating bearing configured to accommodate radial forces on the traction transmission output shaft, wherein at least two of said first, second, and/or third fixed bearings are arranged in the traction transmission cover, wherein the traction transmission drive gearwheel and the first traction transmission intermediate gearwheel form a first traction transmission gearwheel stage, and wherein a transverse contact ratio of said first traction transmission gearwheel stage is greater than 1.70 and less than 1.90.

2. The motor vehicle drive system according to claim 1, wherein all of the fixed bearings of the traction transmission shafts are arranged in said traction transmission cover.

3. The motor vehicle drive system according to claim 1, wherein an overlap ratio of the first traction transmission gearwheel stage is greater than 3.10 and less than 3.30.

4. The motor vehicle drive system according to claim 1, wherein the second traction transmission intermediate gearwheel and the traction transmission output gearwheel form a second traction transmission gearwheel stage, the transverse contact ratio of said second traction transmission gearwheel stage is greater than 1.40 and less than 1.60, and an overlap ratio of the second traction transmission gearwheel stage is greater than 2.40 and less than 2.60.

5. The motor vehicle drive system according to claim 1, wherein the first traction transmission intermediate gearwheel has a first helical toothing with a first helix angle and the second traction transmission intermediate gearwheel has a second helical toothing with a second helix angle, and the first and the second helix angles are directed in the same direction, such that axial forces occurring at the two traction transmission intermediate gearwheels during power transmission at least partially cancel out.

6. The motor vehicle drive system according to claim 1, wherein both the first fixed bearing and the first floating bearing are formed as deep groove ball bearings, said first fixed bearing is arranged in the traction transmission cover, and the electric drive machine is arranged on or in the traction transmission housing.

7. The motor vehicle drive system according to claim 1, wherein both said second fixed bearing and said second floating bearing are formed as deep groove ball bearings, and the second fixed bearing is arranged in the traction transmission cover.

8. The motor vehicle drive system according to claim 1, wherein the third fixed bearing includes a first roller bearing and the third floating bearing includes a second roller bearing, and the first and second cylindrical roller bearings are arranged in an axial direction on different sides of the traction transmission output gearwheel, and the third fixed bearing also includes a deep groove ball bearing or a four-point bearing and is arranged in the traction transmission cover.

9. A motor vehicle, comprising:

at least one motor vehicle drive system according to claim 1;

wherein the motor vehicle has a direction of forward travel in which the motor vehicle is drivable by said motor vehicle drive system.

10. The motor vehicle according to claim 9, wherein in relation to the direction of forward travel in a plane and when the motor vehicle drive system is in a planned installation position, the traction transmission drive shaft is arranged upstream of the traction transmission intermediate shaft, and the traction transmission output shaft is arranged downstream of the traction transmission intermediate shaft.

11. The motor vehicle according to claim 10, wherein in relation to the direction of forward travel in the plane and when the motor vehicle drive system is in the planned installation position, the traction transmission intermediate shaft is arranged higher than the traction transmission drive shaft, and the traction transmission output shaft is arranged lower than the traction transmission drive shaft.

12. The motor vehicle according to claim 9, wherein in relation to the direction of forward travel in a plane and when the motor vehicle drive system is in a planned installation position, the traction transmission drive shaft is arranged downstream of the traction transmission intermediate shaft, and the traction transmission output shaft is arranged upstream of the traction transmission intermediate shaft.

13. The motor vehicle according to claim 12, wherein in relation to the direction of forward travel in the plane and when the motor vehicle drive system is in the planned installation position, the traction transmission intermediate shaft is arranged lower than the traction transmission output shaft, and the traction transmission drive shaft is arranged higher than the traction transmission output shaft.

14. The motor vehicle according to claim 12, wherein in relation to the direction of forward travel in the plane and when the motor vehicle drive system is in the planned installation position, the traction transmission intermediate shaft is arranged higher than the traction transmission output shaft, and the traction transmission drive shaft is arranged higher than the traction transmission output shaft.

15. The motor vehicle according to claim 9, wherein the traction transmission output gearwheel has an output helical toothing with an output helix angle, and the output helix angle is selected such that axial forces of the traction transmission output gearwheel during driving of the motor vehicle in the direction of forward travel are directed in the axial direction of the traction transmission output shaft from the traction transmission cover to the traction transmission housing.

16. A motor vehicle drive system, comprising:

an electromechanical energy converter as an electric drive machine;

a traction transmission apparatus for transmitting drive power to a motor vehicle axle drive, wherein the traction transmission apparatus comprises:

a traction transmission housing device, wherein a traction transmission drive shaft is rotatably mounted in the traction transmission housing device and is connected for conjoint rotation, or is selectively connectable for conjoint rotation, to the electric drive machine, a traction transmission intermediate shaft, which is rotatably mounted in the traction transmission housing device and which is arranged axially parallel to and at a radial spacing from the traction transmission drive shaft, a traction transmission output shaft, which is rotatably mounted in the traction transmission housing device and which is arranged axially parallel to and at a radial spacing from the two other traction transmission shafts, a traction transmission drive gearwheel arranged on the traction transmission drive shaft and meshing with a first traction transmission intermediate gearwheel arranged on the traction transmission intermediate shaft, and a second traction transmission intermediate gearwheel arranged on the traction transmission intermediate shaft and meshing with a traction transmission output gearwheel arranged on the traction transmission output shaft, and wherein the traction transmission housing device has a traction transmission housing and a traction transmission cover, wherein the traction transmission drive shaft is mounted in the traction transmission housing device via a first fixed/floating bearing arrangement having a first fixed bearing configured to accommodate axial forces on the traction drive shaft and a first floating bearing configured to accommodate radial forces on the traction drive shaft, wherein the traction transmission intermediate shaft is mounted in the traction transmission housing device via a second fixed/floating bearing arrangement having a second fixed bearing configured to accommodate axial forces on the traction transmission intermediate shaft and a second floating bearing configured to accommodate radial forces on the traction transmission intermediate shaft, wherein the traction transmission output shaft is mounted in the traction transmission housing device via a third fixed/floating bearing arrangement having a third fixed bearing configured to accommodate axial forces on the traction transmission output shaft and a third floating bearing configured to accommodate radial forces on the traction transmission output shaft, wherein at least two of said first, second, and/or third fixed bearings are arranged in the traction transmission cover, wherein the second traction transmission intermediate gearwheel and the traction transmission output gearwheel form a second traction transmission gearwheel stage, and wherein the transverse contact ratio of said second traction transmission gearwheel stage is greater than 1.40 and less than 1.60.

17. The motor vehicle drive system according to claim 16, wherein an overlap ratio of the second traction transmission gearwheel stage is greater than 2.40 and less than 2.60.

18. The motor vehicle drive system according to claim 16, wherein the second traction transmission intermediate gearwheel and the traction transmission output gearwheel form a second traction transmission gearwheel stage, and the transverse contact ratio of said second traction transmission gearwheel stage is greater than 1.40 and less than 1.60.

\* \* \* \* \*